United States Patent [19]

Moore

[11] Patent Number: 6,048,378
[45] Date of Patent: Apr. 11, 2000

[54] HIGHLY AVAILABLE PARTICULATE CONTROLLED RELEASE NITROGEN FERTILIZER

[75] Inventor: William P. Moore, Hopewell, Va.

[73] Assignee: Lesco, Inc., Rocky River, Ohio

[21] Appl. No.: 09/130,344

[22] Filed: Aug. 13, 1998

[51] Int. Cl.[7] .............................. A01N 25/00; C05C 3/00; C05C 9/00; C05C 9/02
[52] U.S. Cl. ............................ 71/64.01; 71/64.11; 71/11; 71/27; 71/28; 71/29; 71/30
[58] Field of Search ................................. 71/27, 28, 29, 71/30, 64.11, 904, 64.01, 11; 564/63, 73; 528/259; 504/116

[56] References Cited

U.S. PATENT DOCUMENTS 5,266,097  11/1993  Moore ......................................... 71/28

Primary Examiner—Steven P. Griffin
Assistant Examiner—Eileen E. Nave

[57] ABSTRACT

A method preparing controlled release nitrogen in particulate fertilizers which exhibit single growing season availabilities to plants of about 80 percent or higher. The method utilizes relatively low urea and ammonia to formaldehyde mol ratios of about 1.7 urea to 0.1 ammonia to 1 formaldehyde to assure high conversions to controlled release nitrogen with low free ureas, and carefully controlled elevated temperatures, acid dehydration condensation catalyst concentrations and short dehydration reaction times of about 2–4 minutes to provide effective conversion of hydroxymethyl nitrogen compounds by dehydration condensation reaction to controlled release methylene nitrogen compounds. Quick neutralization of the dehydration catalyst in a turbulent mixing reactor minimizes the formation of undesirable methylene nitrogen polymers which are hot water insoluble and unavailable to plants in a single growing season.

21 Claims, No Drawings

HIGHLY AVAILABLE PARTICULATE CONTROLLED RELEASE NITROGEN FERTILIZER

BACKGROUND OF THE INVENTION

1. Field of the Invention

This invention relates to controlled release nitrogen fertilizers and methods for their preparation. More particularly, the present invention is directed to a method of forming a new highly available slow release nitrogen fertilizer by condensing ammonia, urea, and formaldehyde under mildly basic conditions and elevated temperatures and then dehydrating the condensate without substantial polymerization to a controlled release solid fertilizer by means of a weak acid catalyst at elevated temperatures and short reaction times. The method provides granulation of homogeneous solids in a high intensity reactor either as a controlled release nitrogen, or complete N-P-K fertilizer. The new composition provided by this method provides higher nitrogen availabilities in high controlled release nitrogen concentrations than heretofore available.

2. Description of Related Art

Ureaformaldehyde condensation and polymer products are widely used as slow release nitrogen fertilizers for lawns, ornamental plants and crops. These products usually contain methylene urea polymers having low water solubilities and release nitrogen over an extended period of time. The methylene urea polymers decompose by microbial or enzymatic action to water soluble mineral nitrogen.

Prior art workers, such as Goertz in U.S. Pat. No. 4,378,238, disclosed that cold water soluble ureaformaldehyde products consisting of methylene diurea and dimethylene triurea were effective, non burning, particulate fertilizers.

In U.S. Pat. No. 5,102,440 Gallant et al minimized the formation of HWIN by using very high urea to formaldehyde reaction mol ratios and by spraying a liquid urea formaldehyde resin on cool fertilizer raw materials; thereby, forming granules containing high concentrations of free urea.

In the prior art methods, slow release fertilizers are usually prepared by reacting urea and formaldehyde in aqueous alkali solutions to form methylolurea, and then acidifying to form methylene urea polymers. Some workers, such as Greidinger et al in U.S. Pat. No. 4,089,899, maintain low hot water insoluble nitrogen (HWIN) and high free urea contents by carrying out the reaction at low temperatures with large excesses of urea in the reaction mixture. Although the low HWIN is desirable, the high free urea is not because it increases phytotoxicity of the fertilizer significantly, and causes severe granulation difficulties by creating sticky operating conditions. A high process recycle ratio and low process temperature must be used to granulate fertilizers containing high free urea contents because very small amounts of water cause urea containing solids to become sticky and difficult to granulate. When the materials produced at low temperatures are dried at normal drying temperatures, the HWIN usually increases substantially unless some special means of drying is used.

In my U.S. Pat. No. 5,266,097, the introduction of ammonium ion, for example as ammonium sulfate, along with urea and formaldehyde in an acid catalyzed polymerization is used to produce controlled release fertilizer solids. The amount of CWIN was limited by the necessity of including at least 0.05 mol of ammonium per mol of formaldehyde. The amount of ammonia required and the anion required to neutralize it, undesirably increased the osmotic pressure, or osmolality, of the fertilizer. Increasing osmolality has been shown to increase the phytotoxicity of a fertilizer.

Hawkins, in U.S. Pat. No. 4,554,005, reported a heterocyclic aminoureaformaldehyde, s-triazone, to be an effective controlled release liquid fertilizer.

My U.S. Pat. No. 5,449,394 disclosed a heterocyclic, non-polymeric condensed controlled release liquid fertilizer containing substantially 5-methyleneureido-2-oxohexahydro-s-triazine, prepared by the reaction of formaldehyde, urea, and ammonia under near neutral reaction conditions at about 100° C.

Ureaformaldehyde fertilizers have been evaluated in the past by the amount of cold water insoluble nitrogen (CWIN) contained and by the release characteristics of the CWIN. When the CWIN is not soluble in hot water, it is known that the nitrogen is unavailable for plant utilization in the soil for a very long time, if ever. This hot water insoluble nitrogen is undesirable, although many fertilizers found in commercial use have 60 percent or more of their CWIN in the form of hot water insoluble nitrogen (HWIN).

Experience in recent years has shown that the water soluble nitrogen products of the aforementioned U.S. Pat. Nos. 4,554,005 and 5,449,394 are indeed controlled release and exhibit lower phytotoxicity and lower, longer availability than urea nitrogen. A realistic evaluation of the controlled release efficiency of a fertilizer may be made using the following equation:

$$CRE = \frac{CWSCN + CWIN - HWIN \times 100}{WSCN + CWIN}$$

Terms used herein are defined as follows:

Urea-N=urea nitrogen, not controlled release;

$NH_3$-N=ammonia nitrogen, not controlled release;

CWSCN=cold water soluble condensed nitrogen, controlled release;

CWIN=cold water insoluble condensed nitrogen, controlled release;

HWIN=hot water insoluble polycondensed nitrogen, controlled release;

CRE=controlled release nitrogen efficiency factor; and

Controlled Release Nitrogen=CWSCN+CWIN Single growing season availability=CRE=portion of controlled nitrogen available to plants in a single growing season;

Hydroxymethylnitrogen compounds=simple condensation products from the reaction of formaldehyde with the nitrogen compounds urea and/or ammonia, retaining the hydroxymethyl group and substantially free of the methylene group;

Dehydrating reactor=a reactor wherein the hydroxymethyl nitrogen compounds are catalytically reacted to split water from the hydroxy-methyl compounds to convert them to methylene compounds;

Methylene nitrogen compounds=nitrogen compounds in which methylene groups connect nitrogen groups into controlled releasing nitrogen compounds, in which ammonia or urea comprise the nitrogen groups. The nitrogen may be in either linear or cyclic compounds.

A simple condensation reaction may occur when compounds such as urea, or ammonia, react with formaldehyde to form a single compound such as methylolurea, or methylolamine. A simple dehydration condensation reaction may occur when two simple compounds, such as methylolurea combine by splitting out water to form a single compound, such as methylene diurea. A polycondensation dehydration reaction may occur when a plurality of compounds, say six for example, such as methylolurea condense to form a polymer, such as hexamethyleneheptaurea.

The prior art has been based on allowing the formaldehyde, urea, and ammonia, reactions to proceed to equilibrium. Therefore, whenever low urea to formaldehyde ratios, relatively high dehydration reaction temperatures, and effective dehydration catalysts have been employed, polycondensation dehydration reactions occurred. These cause the formation of undesirably large amounts of hot water insoluble nitrogen, which is unavailable to plants in a single growing season. The polycondensation also results in the production of undesirable free urea from the intermediate methylolureas even when relatively low urea to formaldehyde mol ratios are used.

There have been no prior art teachings in which the urea, formaldehyde, ammonia system reaction was used to obtain high simple condensation conversion at a high rate, and the condensation reaction stopped before equilibrium was reached where polymeric condensates and free urea were produced. Instead, the prior art has used techniques such as adding excess urea to retard the polycondensation, or used weak reaction conditions such as low reaction temperatures and weak dehydration catalysts to slow the reaction.

The prior art has, to a large extent, been directed to increasing the portion of slow release condensed and low polymeric ureaformaldehyde nitrogen and decreasing the amounts of higher polymers in the fertilizers. Unfortunately, these prior art improvements have been achieved by increasing other undesirable properties of the controlled release nitrogen fertilizers, such as increased free urea concentrations and burn potentials.

OBJECTS OF THE INVENTION

A primary object of this invention is to provide a new plant nutrient composition containing substantially controlled release nitrogen with heretofore unavailably high controlled release nitrogen efficiencies.

Another object of this invention is to provide a new composition containing plant nutrients bound together into physically homogeneous granules by nonpolymeric condensed methylene nitrogen compounds in highly efficient controlled release form.

A further object of this invention is to provide a new and effective method of preparing the new plant nutrient compositions.

SUMMARY OF THE INVENTION

I have now discovered that formaldehyde, urea, and ammonia may be reacted almost completely under base conditions to form water soluble liquid hydroxymethyl intermediates, such as methylolurea a nd methylolamine, and that these intermediates may be effectively converted to highly efficient controlled release particulate nitrogen fertilizers by a simple acid catalyzed condensation reaction and the reaction stopped before unavailable hot water insoluble nitrogen and free urea are formed in significant amounts. Further, the conditions which provide for driving the reaction to, and stopping it at, the efficient controlled release point, were discovered. It was found that the new method allowed the preparation and use of a new and improved controlled release nitrogen fertilizer.

DETAILED DESCRIPTION OF THE INVENTION

The present invention is directed to a method of preparing controlled release nitrogen fertilizers with high single growing season nitrogen availabilities of 80 percent or higher. Nitrogen fertilizers containing less than 5 percent nitrogen do not usually require controlled release properties, and about 40 percent nitrogen is the maximum concentration of nitrogen possible using the mol ratios of formaldehyde, urea, and ammonia required in the instant method.

The instant method requires comingling and coreacting aqueous formaldehyde, urea, and ammonia in mol ratios of between 1 to 1.65 to 0.03, and 1 to 1.85 to 0.30 while maintaining temperature between 85 and 95° C., pressure between 40 and 1000 mm Hg, pH between 8 and 9, for a period of time between 15 and 45 minutes. These reaction conditions are required to completely react the formaldehyde with the urea and ammonia to form a liquid condensate solution which contains less than 0.1 percent ammonia nitrogen, and less than 5 percent urea nitrogen.

To the liquid condensate solution, an acid dehydrating catalyst is admixed in amounts sufficient to reduce the pH of the solution to between 3 and 4. It is necessary that the catalyst be admixed quickly in a period of time amounting to between 10 and 60 seconds. A relatively high dehydrating reaction temperature of between 110 and 130° C. must be maintained for a period of time between 1 and 10 minutes to allow more than 70 percent of the nitrogen to be converted to controlled release nitrogen and to allow sufficient water to be ev aporate d to produce particulate solids.

It is necessary to promptly neutralize the particulate solid condensates to a pH between 6 and 7 to stop the dehydrating condensation reaction before more than 20 percent of the controlled release nitrogen reacts further to form polymeric condensates which are hot water insoluble and unavailable to plants in a single growing season.

One of the keys to the high conversions of nitrogen to controlled release nitrogen is the relatively low urea and ammonia to formaldehyde range of molecular ratios. When ratios higher than the aforementioned ratios are used the low free urea requirements for this invention are not met, and the product has higher than desired potential for plant phytotoxicity. When the ratios are lower than the aforementioned the amount of hot water insoluble nitrogen formed is too high to allow a high degree of controlled release nitrogen efficiency for providing nitrogen to plants in a single growing season.

An even better combination of high conversion of nitrogen to controlled release and high single season nitrogen efficiency or low hot water insolubility is obtained when the mol ratios of formaldehyde, urea, and ammonia are held in the narrow range between 1 to 1.70 to 0.03 and 1 to 1.80 to 0.10.

The formaldehyde and a minor portion of the urea may be advantageously provided as a urea formaldehyde concentrate containing methylolureas, free formaldehyde, and a relatively small portion of water. These commercially available solutions are usually supplied with about a 5.5/1 formaldehyde to urea mol ratio and 15 percent water. The use of the concentrates reduces the amount of moisture which must be removed from the reactants to provide dry granular products from the liquid raw materials.

In the initial comingling and coreacting of the aqueous formaldehyde, urea, and ammonia, it is important that the pH be maintained between 8 and 9. This is preferably done by admixing an alkali metal base in the solution at concentrations between 0.01 and 1.00 percent.

One, or a combination, of several acid dehydrating reaction catalysts may be used effectively in the method, including phosphoric acid, formic acid, acetic acid, citric acid, sulfuric acid, magnesium chloride, and ammonium sulfate.

It is important that the dehydrating reaction catalyst be added in a short period of time. Addition times amounting to between 20 and 40 seconds are preferred.

In the instant method it is key that the dehydrating reaction temperature be accurately maintained, preferably between 110 and 130° C., to match the preferred dehydrating reaction time period, amounting to between 2 and 4 minutes. Operation outside the preferred limits allows either too high free urea a nd plant phytotoxicity, or too low a controlled release nitrogen single season availability to plants.

The method of th is invention requires the addition of little or no solids to produce the improved particulate fertilizer composition of this invention; however, other solids may be added during the dehydrating reaction and still produce effective fertilizers. Particulate fertilizer solids, including primary and minor plant nutrients may be effectively used in the instant method. It is preferred to homogeneously admix particulate fertilizer solids amounting to between 0.05 and 4.00 times the weight of the solid condensates, during the period of time between 1 and 10 minutes after the dehydrating reaction commences, at a temperature between 110 and 130° C., and before the particulate solid condensates formed are neutralized to a pH between 6 and 7.

It is preferred that the fertilizer solids admixed during the dehydrating reaction comprise fine, dry, particles, more than 90 percent of which exhibit particle diameters smaller than 0.3 mm.

Particularly, when a narrow product particle size range is desired, appreciable amounts of extra, fine range product is available for recycle. It is advantageous to recycle this material as fertilizer solids for admixing during the dehydrating reaction of the preparation.

Other particulate fertilizer solids which may be advantageously and homogeneously admixed during the dehydrating reaction are primary plant nutrients including potassium sulfate, potassium chloride, ammonium phosphate, ammonium sulfate, potassium nitrate, urea, and potassium phosphate.

Minor plant element salts containing the metals, iron, manganese, magnesium, copper, zinc and calcium may be added as particulate fertilizer solids during the dehydrating reaction.

The timely neutralization of the acid dehydrating catalyst to a pH between 6 and 7 is essential to preserving the controlled release nitrogen without producing hot water insoluble nitrogen polymers which are not available to plants in a single growing season. The preferred bases for neutralizing the catalyst are magnesia, lime, ammonia, soda ash, sodium hydroxide, potassium carbonate and potassium hydroxide.

Although the neutralized particulate solid condensates are damp dry as they leave the dehydrating reactor and may be used as such; it is preferred to dry the particulate condensates to a moisture content between 0.5 and 2.5 percent at temperatures between 95 and 120° C. for periods of time amounting to between 1 and 10 minutes. Higher temperatures and longer drying times undesirably increase hot water insoluble nitrogen.

The method of this invention allows the preparation of a new and improved particulate fertilizer composition which contains between 5 and 40 percent nitrogen, of which, heretofore unavailably high portions, about 70 percent or more, are controlled release nitrogen, which exhibit surprisingly high single growing season availabilities to plants of about 80 percent, or more. The single season growing availability, or controlled release nitrogen efficiency is determined by dividing the total controlled release nitrogen into the total controlled release nitrogen minus the unavailable, hot water insoluble nitrogen, times 100.

In a preferred embodiment of the present invention of preparing granular nitrogen fertilizers containing substantially controlled release nitrogen which exhibits high single growing season availabilities, aqueous formaldehyde, urea, and ammonia are comingled in mol ratios of between 1 to 1.70 to 0.03 and 1 to 1.80 to 0.10, respectively, to form a homogeneous liquid, and sodium hydroxide is admixed therewith to bring pH of the liquid to between 8 and 9.

The temperature and pressure of the liquid are maintained between 85 and 95° C. and 200 and 780 mm Hg, respectively, for a period of time amounting to between 15 and 30 minutes until the formaldehyde is completely coreacted with the urea and ammonia to form liquid, water soluble, condensates containing hydroxymethyl nitrogen compounds, and containing less than 0.1 percent ammonia nitrogen and 5.0 percent urea nitrogen.

A dehydrating reactor is readied for use by preheating to a temperature between 85 and 95° C. The preheat is usually available as residual heat from the previous exothermic dehydrating and condensation reaction.

The dehydrating reactor comprises an enclosed pan, rotating clockwise at an angle of about 20 to 40 degrees from horizontal, and contains a mixing rotor fitted with blades of 25 to 50 percent of the pan diameter. The rotor rotates counterclockwise at between 4 and 10 times the peripheral speed of the pan. It is possible to operate the dehydrating reaction with the pan and rotor both operating in the same direction, although somewhat higher power inputs are normally required in that mode of operation.

The liquid water soluble condensates are charged to the dehydrating reactor and admixed with sufficient aqueous acid dehydrating catalyst in a period of time between 10 and 60 seconds to reduce pH to between 3 and 4.

The temperature is increased in the dehydrating reactor by exothermic dehydration condensation reaction to between 110 and 130° C. to cause the dehydration reaction to proceed for a period of time amounting to between 2 and 4 minutes until more than 80 percent of the hydroxymethyl nitrogen compounds have been converted to methylene nitrogen compounds, and sufficient water has been evaporated to cause solidification of the methylene compounds.

Then fine, dry particulate fertilizer solids, more than 90 percent of which exhibit diameters smaller than 0.3 mm, amounting to between 0.05 and 4.00 times the weight of the solid methylene compounds are admixed in the dehydrating reactor after the dehydration reaction has proceeded for a period of time between 1 and 3 minutes and before the methylene compounds are solidified.

Then, the dehydration condensation reaction is stopped by admixing therewith sufficient base to neutralize the methylene compounds and fertilizer solids to a pH of between 6 and 7, and cooling to a temperature lower than 60° C. before more than 15 percent of the methylene nitrogen forms polymeric, unavailable in a single growing season, hot water insoluble nitrogen.

The operation of the aforementioned dehydrating reactor as a granulator is continued with moisture contents in the neutralized methylene compounds and fertilizer solids amounting to between about 8 and 15 percent, until granules form. The granules are then dried by conventional means to a moisture content between 0.5 and 2.5 percent.

The foregoing method is effective when recycled product is used as the particulate fertilizer solids. Primary plant nutrients which are effective particulate fertilizer solids are potassium sulfate, potassium chloride, ammonium phosphate, ammonium sulfate, potassium nitrate, urea, and potassium phosphate. Also effective particulate fertilizer solids are minor element salts containing the metals iron, manganese, magnesium, copper, zinc, and calcium.

The use of the foregoing method provides a new, improved, and heretofore unavailable granular fertilizer containing more than 80 percent of its nitrogen in the form of controlled release nitrogen derived from methylene nitrogen compounds, which exhibit less than 15 percent of their nitrogen in the form of polymeric, unavailable in one growing season, hot water insoluble nitrogen.

MODE OF OPERATION OF THE INVENTION

Having described the basic concepts of the instant invention, reference is now made to the following examples which are provided to illustrate the method of this invention, and its efficacious composition.

EXAMPLE 1

This example is provided to demonstrate a preferred method of preparing granular nitrogen fertilizers containing substantially controlled release nitrogen which exhibits high CRE (controlled release efficiencies) and single growth season availabilities.

To an enclosed stainless steel 304 reaction kettle equipped with a heating and cooling internal coil and jacket, a reflux condenser, mixing agitator, and a circulating pump was added in the order listed the following ingredients:

| Ingredients | kilograms |
| --- | --- |
| UF Concentrate, 60HCHO, 25 urea | 11.60 |
| Urea, 46-0-0 | 21.46 |
| Anhydrous ammonia | 00.40 |
| Caustic Soda, 50% NaOH | 00.05 |
| Total liquid mixture | 33.51 |

The liquid mixture containing formaldehyde to urea to ammonia in a mol ratio of 1 to 1.75 to 0.1 exhibited a pH of 8.6 and was heated to a temperature of 90° C. at one atmosphere (760 mm Hg) pressure for a period of time amounting to 45 minutes with constant agitation, and with the reflux condenser returning all condensate derived from evaporation to the kettle. At the end of the 45 minutes reaction period analyses showed zero free formaldehyde, 0.03 percent free ammonia, and 3.02 percent urea nitrogen.

A dehydrating reactor was preheated to 85° C. The reactor consisted of a vertical rotary pan 0.72 meters in diameter, 0.38 meters deep, inclined from the vertical position by 30°. The pan was equipped with a stationary wall scraper-deflector which deflects the contents of the pan toward a high speed rotor 0.35 meters in diameter located 6 centimeters from the bottom of the pan so that its tips pass 3 centimeters from the wall of the pan. The rotor consisted of a 7.5 centimeter diameter shaft with 7 steel bars 2 centimeters thick and 5 centimeters wide protruding radially equi-spaced therefrom, starting at the bottom of the shaft, with each additional bar located 3 centimeters above the next lower bar. The pan was rotating clockwise at a rim speed of 0.55 meters per second and the rotor was operated in a countercurrent direction at a tip speed of 9.8 meters per second, producing strong shear forces, inducing rapid homogeneous mixing of fluids and solids.

The liquid mixture was charged to the dehydrating reactor and in a 30 second period 0.42 kilograms of orthophosphoric acid dehydration catalyst containing 20 percent $P_2O_5$ was added bringing the pH to 3.3 and starting the dehydration-condensation reaction. The exothermic reaction increased the temperature in the reactor to 127° C. quickly. The reaction was allowed to continue for a period of 4 minutes until sufficient water had been evaporated to cause solidification of the methylene nitrogen compounds formed by dehydration of the hydroxymethyl nitrogen compounds in the liquid mixture. Analyses showed that 86 percent of the combined water in the hydroxymethyl nitrogen compounds was released as free water in the dehydration-condensation reaction forming methylene nitrogen compounds.

Fine dry particulate fertilizer solids, consisting of recycled product, which had been screened so that 95 percent of the particles had diameters smaller than 0.3 mm, amounting to 65.04 kilograms, were admixed in the dehydrating reactor mixture 2.5 minutes after the acid catalyst addition was completed and before the methylene compounds were solidified.

At the end of the 4 minute dehydration reaction, magnesium oxide powder amounting to 1.03 kilograms was admixed in the dehydration reactor mix to neutralize it to a pH of 6.7, and the mix was cooled to a temperature of 56° C. in 2.5 minutes. Analyses showed that 8.1 percent of the methylene nitrogen had formed polymeric, hot water insoluble nitrogen.

The dehydration reactor was operated for an additional minute with about 10 percent moisture content in the reacted mixture to form granules.

The granules were discharged from the dehydrating reactor batchwise, and then fed continuously through a fluid bed dryer to reduce moisture content to 1.2 percent as determined by drying at 65° C. in a vacuum oven at 20 mm Hg pressure for 2 hours. The product was screened, and the materials passing through 0.3 mm opening screens recovered for recycling.

Dry product amounting to 87.1 kilograms, prior to recycle, was analyzed with the results listed as follows:

| Components | Wt % |
| --- | --- |
| Total nitrogen, N | 38.40 |
| CWSCN | 19.20 |
| CWIN | 15.40 |
| HWIN | 8.40 |
| TOTAL CRN | 34.60 |
| UREA-N | 3.80 |
| $P_2O_5$ | 0.10 |
| Mg | 0.70 |
| Moisture | 1.20 |

The total conversion of nitrogen to controlled release (CWSCN+CWIN) was calculated to be 90.1 percent and the availability of the controlled release nitrogen (that portion of the controlled release not hot water insoluble) was calculated to be 75.7 percent.

EXAMPLE 2

This example is provided to demonstrate the safety from phytotoxicity and the efficacy of the preferred granular fertilizer composition of the instant invention. Osmolality has been shown in the art to be an accurate indicator of phytotoxicity of nitrogen fertilizers with increasing osmolality (osmotic pressure of aqueous fertilizers) indicating increasing phytotoxicity. Osmolalities were measured at the 3 percent nitrogen level in water from the product of Example 1 and various other nitrogen fertilizers for comparison. These results are tabulated as follows:

| Fertilizer Material | Osmolality MMol kg$^{-1}$ (3% N) |
|---|---|
| EXAMPLE 1 (38-1-0) | 315 |
| Methylenediurea, pure, 42-0-0 | 300 |
| Monomethylolurea, 31-0-0 | 906 |
| Urea, 46-0-0 | 1071 |

To evaluate the availabilities to plants in soil of the nitrogens in several controlled release products, the products were applied to a plot growing Kentucky Bluegrass, at the rate of 3 pounds of nitrogen per 1000 square feet, and the soil was sampled through a single growing season in the laboratory at ambient temperature to determine the amount of unmineralized nitrogen remaining in the soil. The results are tabulated as follows:

| Fertilizer Material | Percent Unmineralized Nitrogen Remaining After | | | | |
|---|---|---|---|---|---|
| | 1 day | 7 days | 14 days | 35 days | 88 days |
| Urea | 85 | 41 | 5 | 4 | 2 |
| Example 1 Product | 96 | 62 | 36 | 24 | 12 |
| Nitroform | 94 | 72 | 61 | 56 | 46 |

It may seem that the urea mineralized rapidly and was available and spent in a relatively short period, and that the Nitroform sample was still only about one-half mineralized after a growing season. The product of Example 1, mineralized slowly but consistently throughout the growing season, leaving a small 12% unmineralized after 88 days in the soil.

EXAMPLE 3

This example is provided to demonstrate a perferred method of preparing particulate complete NPK fertilizers containing substantially controlled release nitrogen which exhibits high controlled release efficiencies.

Using the enclosed stainless steel reaction kettle of Example 1, the following ingredients were added in the order listed:

| Ingredients | kilograms |
|---|---|
| UF Concentrate, 60HCHO, 25 urea | 7.54 |
| Aqua ammonia, 23-0-0 | 2.00 |
| Caustic soda, 50% N$_a$OH | 0.05 |
| Urea, 46-0-0 | 13.89 |
| Total liquid mixture | 23.48 |

The liquid mixture exhibited a pH of 8.3 and was heated to a temperature of 91° C. at 745 mm Hg pressure for a period of time amounting to 35 minutes. Analysis showed zero free formaldehyde, 0.01 percent free ammonia, and 3.61 percent urea nitrogen.

The dehydrating reactor of Example 1 was preheated to a temperature of 90° C., and the liquid mixture was charged thereto, and 3.75 kilograms of 40 percent P$_2$O$_5$ orthophosphoric acid dehydrating catalyst was added over a 30 second period to bring the pH of the mixture to 3.0 to initiate the dehydration-condensation reaction. The exothermic reaction increased the temperature in the reactor to 120° C. quickly. The reaction was allowed to continue for a period of 3.5 minutes until solidification of the methylene compounds formed commenced.

Fine dry particulate fertilizer solids which had been premixed, and screened to exhibit particle diameters smaller than 0.3 mm, amounting to 74.30 kilograms, were admixed in the dehydrating reactor mixture 2.5 minutes after the acid catalyst addition was completed, and before the solidification of the methylene compounds was completed. The composition of the dry particulate fertilizer solids added is tabulated as follows:

| Ingredients | kilograms |
|---|---|
| Potassium Sulfate 0-0-50 | 36.59 |
| Ferrous Sulfate, 30 Fe | 15.30 |
| Monoammonium Phosphate, 11-52-0 | 6.72 |
| Total weight of all reactants | 97.78 |

At the end of the 3.5 minute dehydration reaction, magnesium oxide powder amounting to 1.20 kilograms was admixed in the reaction mixture to neutralize it to pH 6.3, and then 10.66 kilograms of gypsum was admixed as a granulation aid. The mixture was cooled to 42° C. during continued mixing for an additional 3 minutes while the granules became more spherical in shape with a moisture content of 11 percent.

The granules were dried in a rotary dryer to a moisture content of 1.1 percent and analyzed to show the following composition:

| Components | Wt % |
|---|---|
| Total nitrogen, N | 9.64 |
| CWSCN | 3.79 |
| CWIN | 4.58 |
| HWIN | 1.44 |
| TOTAL CRN | 8.37 |
| NH$_3$—N | 0.14 |
| Urea-N | 1.40 |
| P$_2$O$_5$ | 6.35 |
| K$_2$O | 21.46 |
| Fe | 4.96 |
| Ca | 1.02 |
| S | 11.70 |
| Mg | 1.08 |
| Moisture | 1.10 |

The total conversion of nitrogen to controlled release was 88.0 percent and the availability of the controlled release nitrogen was 84.3 percent.

I claim:

1. A method of preparing controlled release nitrogen particulate fertilizers containing between about 5 and 40 percent nitrogen which exhibit single growing season nitrogen availabilities to plants of about 80 percent or more, comprising:

(a) comingling and coreacting aqueous formaldehyde, urea, and ammonia in mol ratios of between 1 to 1.65 to 0.03 and 1 to 1.85 to 0.30, while maintaining temperature between 85 and 95° C., pressure between 40 and 1000 mm Hg, pH between 8 and 9, for a period of time between 15 and 45 minutes until the formaldehyde is completely reacted with the urea and ammonia to form a liquid condensate solution, containing less than 0.1 percent ammonia nitrogen and less than 5 percent urea nitrogen;

(b) admixing the liquid condensate solution with sufficient acid dehydrating catalyst to reduce pH to between 3 and 4 in a period of time amounting to between 10 and 60 seconds, and then maintaining a dehydrating reaction temperature of between 110 and 130° C. for a period of time amounting to between 1 and 10 minutes, until more than 70 percent of the nitrogen is converted to controlled release nitrogen condensates and sufficient water has been evaporated to produce particulate solids; and, (c) neutralizing the particulate solid condensates to a pH between 6 and 7 to stop the dehydrating condensation reaction before more than 20 percent of the controlled release nitrogen form polymeric condensates which are hot water insoluble and unavailable to plants in a single growing season.

2. The method of claim 1 wherein the formaldehyde, urea, and ammonia are comingled and reacted in mol ratios between 1 to 1.70 to 0.03 and 1 to 1.80 to 0.10.

3. The method of claim 1 wherein the formaldehyde and a minor part of urea is provided as a urea formaldehyde concentrate containing methylolureas, free formaldehyde, and water.

4. The method of claim 1 wherein the comingling and coreacting of aqueous formaldehyde, urea, and ammonia is done with the pH maintained between 8 and 9 by admixing therewith an alkali metal base in concentrations between 0.01 and 1.0 percent.

5. The method of claim 1 wherein the acid dehydrating catalyst is selected from the group consisting of phosphoric acid, magnesium chloride, formic acid, acetic acid, citric acid, sulfuric acid, and ammonium sulfate.

6. The method of claim 1 wherein the acid dehydrating catalyst is admixed in a period of time amounting to between 20 and 40 seconds.

7. The method of claim 1 wherein the dehydrating reaction temperature of between 110 and 130° C. is maintained for a period of time amounting to between 2 and 4 minutes.

8. The method of claim 1 wherein particulate fertilizer solids amounting to between 0.05 and 4.00 times the weight of the solid condensates are homogeneously admixed during the period of time between 1 and 10 minutes after the dehydrating reaction commences at a temperature between 110 and 130° C. and before the particulate solid condensates formed are neutralized to a pH between 6 and 7.

9. The method of claim 8 wherein the fertilizer solids comprise fine dry particles more than 90 percent of which exhibit diameters smaller than 0.3 mm.

10. The method of claim 8 wherein the particulate fertilizer solids comprise recycled fine product.

11. The method of claim 8 wherein the particulate fertilizer solids are primary plant nutrients selected from the group consisting of potassium sulfate, potassium chloride, ammonium phosphate, ammonium sulfate, potassium nitrate, urea, and potassium phosphate.

12. The method of claim 8 wherein the particulate fertilizer solids are plant minor element salts containing one or more of the metals selected from the group consisting of iron, manganese, magnesium, copper, zinc, and calcium.

13. The method of claim 1 wherein the particulate solid condensates are neutralized to a pH between 6 and 7 by admixing therewith bases selected from the group consisting of magnesia, lime, ammonia, soda ash, sodium hydroxide, potassium carbonate and potassium hydroxide.

14. The method of claim 1 wherein the neutralized particulate solid condensate is dried to a moisture content between 0.5 and 2.5 percent at temperatures between 95 and 120° C. for periods of time amounting to between 1 and 10 minutes.

15. A new and improved particulate fertilizer composition containing between 5 and 40 percent nitrogen of which about 70 percent, or more, is controlled release nitrogen which exhibits single growing season availabilities to plants of about 80 percent, or more, prepared by the method of claim 1.

16. A method of preparing granular nitrogen fertilizers containing substantially controlled release nitrogen exhibiting high single growing season availabilities comprising:

(a) comingling aqueous formaldehyde, urea, and ammonia in mol ratios of between 1 to 1.70 to 0.03 and 1 to 1.80 to 0.10, respectively to form a homogeneous liquid;

(b) admixing sodium hydroxide with the homogeneous liquid to bring its pH to between 8 and 9 and maintaining a temperature of between 85 and 95° C. and a pressure between 200 and 780 mm Hg for a period of time between 15 and 30 minutes until the formaldehyde is completely coreacted with the urea and ammonia to form liquid water soluble condensates containing hydroxymethyl nitrogen compounds and containing less than 0.1 percent ammonia and 5.0 percent urea nitrogen;

(c) preheating to a temperature of between 85 and 95° C. a dehydrating reactor comprising an enclosed pan, rotating clockwise at an angle of about 20 to 40 degrees from horizontal, and containing a mixing rotor fitted with blades of 25 to 50 percent of the pan diameter, rotating counterclockwise at between 4 and 10 times the peripheral speed of the pan;

(d) charging the liquid, water soluble, condensates to the dehydrating reactor and admixing therewith sufficient aqueous acid dehydrating catalyst in a period of time between 10 and 60 seconds to reduce pH to between 3 and 4;

(e) increasing temperature in the dehydrating reactor by exothermic dehydration condensation reaction to between 110 and 130° C. to cause the dehydration reaction to proceed for a period of time between 2 and 4 minutes until more than 80 percent of the hydroxymethyl nitrogen compounds have been converted to methylene nitrogen compounds, and sufficient water has been evaporated to cause solidification of the methylene compounds;

(f) admixing in the dehydrating reactor therewith fine, dry particulate fertilizer solids more than 90 percent of which exhibit diameters smaller than 0.3 mm, amounting to between 0.05 and 4.00 times the weight of the solid methylene compounds after the dehydration reaction has proceeded for a period of time between 1 and 3 minutes and before the methylene compounds are solidified;

(g) admixing therewith sufficient base to neutralize the methylene compounds and the fertilizer solids to a pH between 6 and 7 and cooling to a temperature lower than 60° C. to stop the dehydration reaction before more than 15 percent of the methylene nitrogen compound forms polymeric, unavailable in a single growing season, hot water insoluble nitrogen; and, (h) continuing operation of the dehydrating reactor as a granulator with moisture contents in the neutralized methylene compounds and fertilizer solids amounting to between about 8 and 15 percent until granules form, and then drying by conventional means to a moisture content of between 0.5 and 2.5 percent.

17. The method of claim 16 wherein the particulate fertilizer solids comprise recycled product.

18. The method of claim 16 wherein the particulate fertilizer solids are primary plant nutrients selected from the group consisting of potassium sulfate, potassium chloride, ammonium phosphate, ammonium sulfate, potassium nitrate, urea, and potassium phosphate.

19. The method of claim 16 wherein the particulate fertilizer solids are minor element salts containing one or more of the metals selected from the group consisting of iron, manganese, magnesium, copper, zinc, and calcium.

20. The method of claim 16 wherein the enclosed pan and the mixing rotor both rotate in the same direction.

21. An improved granular fertilizer composition prepared by the method of claim 16 containing more than 80 percent of its nitrogen in the form of controlled release nitrogen derived from methylene nitrogen compounds, which exhibit less than 15 percent of its nitrogen in the form of polymeric, unavailable in a single growing season, hot water insoluble nitrogen.

* * * * *